(12) United States Patent
Le Toumelin

(10) Patent No.: US 12,259,550 B2
(45) Date of Patent: Mar. 25, 2025

(54) ADJUSTMENT DEVICE, ADJUSTMENT UNIT, HEAD-UP DISPLAY AND MOTOR VEHICLE

(71) Applicant: Valeo Schalter und Sensoren GmbH, Bietigheim-Bissingen (DE)

(72) Inventor: Loic Le Toumelin, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 524 days.

(21) Appl. No.: 17/635,878

(22) PCT Filed: Aug. 6, 2020

(86) PCT No.: PCT/EP2020/072076
§ 371 (c)(1),
(2) Date: Feb. 16, 2022

(87) PCT Pub. No.: WO2021/032490
PCT Pub. Date: Feb. 25, 2021

(65) Prior Publication Data
US 2022/0283436 A1 Sep. 8, 2022

(30) Foreign Application Priority Data
Aug. 22, 2019 (DE) .................. 10 2019 122 574.4

(51) Int. Cl.
*G02B 27/01* (2006.01)
*B60K 35/00* (2006.01)
(Continued)

(52) U.S. Cl.
CPC .......... *G02B 27/0149* (2013.01); *B60K 35/00* (2013.01); *G02B 7/1824* (2013.01);
(Continued)

(58) Field of Classification Search
CPC .. G02B 27/01; G02B 27/017; G02B 27/0149; G02B 27/0172; G02B 7/00; G02B 7/005;
(Continued)

(56) References Cited

U.S. PATENT DOCUMENTS

2014/0354002 A1* 12/2014 Bisceglia ............... B60K 35/10
296/37.12
2016/0176291 A1* 6/2016 Nonnenbroich ....... B60K 37/00
248/201
(Continued)

FOREIGN PATENT DOCUMENTS

DE 102018122338 A1 3/2019
DE 102017126384 A1 5/2019
(Continued)

OTHER PUBLICATIONS

International Search Report and Written Opinion in corresponding International Application No. PCT/EP2020/072076, mailed Oct. 27, 2020 (9 pages).
(Continued)

*Primary Examiner* — Sultan Chowdhury
(74) *Attorney, Agent, or Firm* — Osha Bergman Watanabe & Burton LLP

(57) ABSTRACT

An adjustment device for adjusting an orientation of a reflection device of a head-up display, to an adjustment unit, to a head-up display and to a vehicle is disclosed. The adjustment device includes a support structure and a clamping device, wherein the clamping device is configured to be displaced along a first axis and comprises a first clamping element and a second clamping element arranged opposite to the first clamping element and forming a clamping gap together with the first clamping element, wherein the clamping device is configured to receive and clamp an adjustment lever of the reflection device between the first clamping element and the second clamping element, wherein the first
(Continued)

Figure 1:
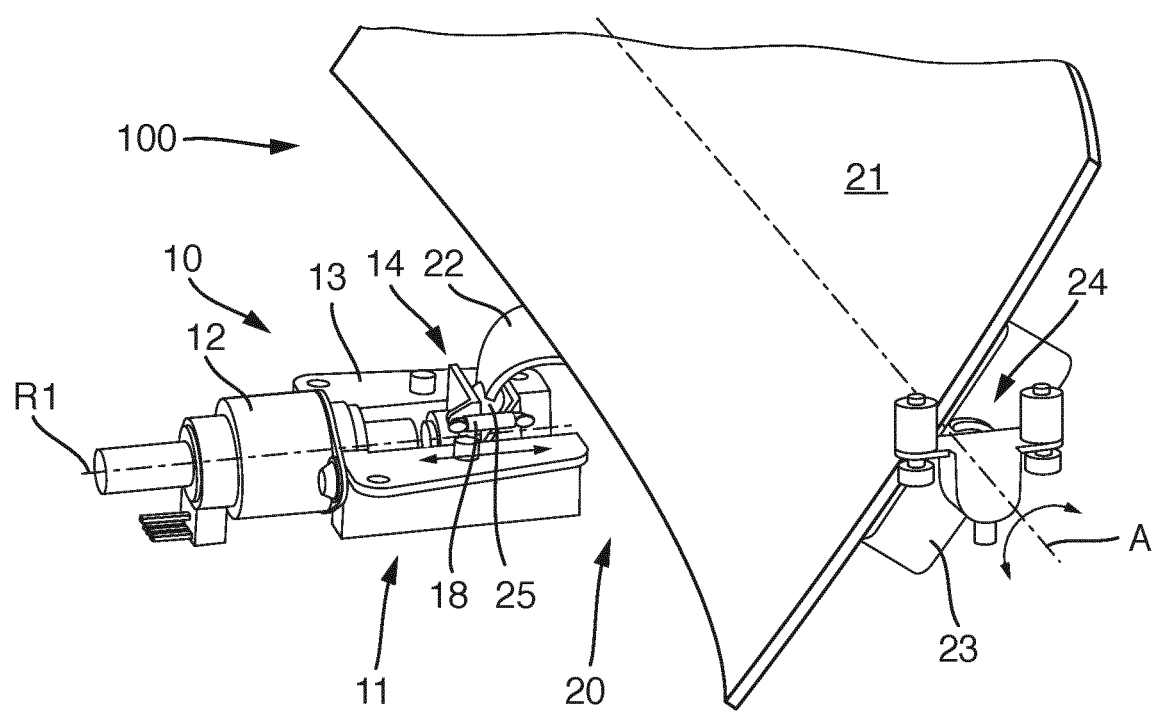

clamping element and the second clamping element are made of separate parts, and wherein the first clamping element and the second clamping element are rotatably coupled to each other about a second axis.

16 Claims, 7 Drawing Sheets

(51) Int. Cl.
 *G02B 7/182* (2021.01)
 *B60K 35/23* (2024.01)
 *B60K 35/50* (2024.01)
(52) U.S. Cl.
 CPC .............. *B60K 35/23* (2024.01); *B60K 35/50* (2024.01); *B60K 2360/23* (2024.01); *B60K 2360/822* (2024.01); *G02B 2027/0154* (2013.01)
(58) Field of Classification Search
 CPC ........ G02B 7/18; G02B 7/182; G02B 7/1821; G02B 7/1822; G02B 7/1824; G02B 7/1827; B60K 35/00; B60K 35/22; B60K 35/23; B60K 35/29; B60K 35/50; B60K 35/53; B60K 2360/00; B60K 2360/23; B60K 2360/31; B60K 2360/822
 See application file for complete search history.

(56) References Cited

U.S. PATENT DOCUMENTS

| | | | |
|---|---|---|---|
| 2016/0184979 A1* | 6/2016 | Roesch | ................... B25B 5/006 81/367 |
| 2017/0315355 A1 | 11/2017 | Sato et al. | |
| 2019/0086664 A1 | 3/2019 | Hatasako et al. | |
| 2020/0326541 A1* | 10/2020 | Schoch | ................... B60K 35/00 |
| 2021/0370775 A1* | 12/2021 | Yamada | ............... B60K 35/213 |

FOREIGN PATENT DOCUMENTS

| | | |
|---|---|---|
| DE | 102018130920 A1 | 6/2020 |
| EP | 3232250 A1 | 10/2017 |
| JP | 2014-215459 A | 11/2014 |
| JP | 2015102700 A | 6/2015 |
| WO | 2018/092624 A1 | 5/2018 |
| WO | 2018/092636 A1 | 5/2018 |
| WO | 2019/054163 A1 | 3/2019 |
| WO | 2019044322 A1 | 3/2019 |

OTHER PUBLICATIONS

German Search Report issued in corresponding German Application No. 10 2019 122 574.4, dated Oct. 22, 2019 (5 pages).

* cited by examiner

ADJUSTMENT DEVICE, ADJUSTMENT UNIT, HEAD-UP DISPLAY AND MOTOR VEHICLE

The present invention relates to an adjustment device, in particular to a displacement device, for adjusting a position and/or an orientation of a reflection device of a head-up display, in particular of a mirror device, in particular for moving a reflection device of a windshield head-up display to adjust the reflection device, wherein the adjustment device comprises a support structure and a clamping device received by the support structure, wherein the clamping device is configured to be displaced along a first axis relatively to the support structure, wherein the clamping device is guided by the support structure whilst displacement, wherein the clamping device is couplable, directly or indirectly, with a drive unit for being displaced along the first axis relatively to the support structure by the drive unit, wherein the clamping device comprises a first clamping element and a second clamping element arranged opposite to the first clamping element and forming a clamping gap together with the first clamping element, wherein the clamping device is configured to receive and clamp an adjustment lever of the reflection device to be adjusted between the first clamping element and the second clamping element in the clamping gap, and wherein the first clamping element and the second clamping element are made of separate parts.

The present invention further relates to an adjustment unit for adjusting a position and/or an orientation of a reflection device of a head-up display, in particular of a mirror device, in particular to an adjustment unit for moving a reflection device of a windshield head-up display to adjust the reflection device, comprising an adjustment device and a drive unit coupled to the clamping device of the adjustment device, wherein the clamping device is displaceable by the drive unit along the first axis.

The present invention further relates to a head-up display, in particular for a vehicle, in particular to a windshield head-up display, comprising an adjustable reflection device for reflecting light beams emitted by an image generating unit into an observer's field of view, wherein the reflection device comprises a reflection element and at least on adjustment lever.

Furthermore, the present invention relates to a vehicle comprising such a head-up display. Head-up displays, in particular for vehicles, usually comprise an image generating unit for generating an image and a reflection device for projecting the generated image, for example, to a combiner as a kind of a screen or directly onto a windshield of a vehicle, wherein the image is preferably projected into the viewing direction of a driver of the vehicle, in particular such that the driver can see the projected image when looking at the combiner or the windscreen without moving his head and/or without changing viewing direction.

Due to different sizes and different proportions of different drivers, it is advantageous, if the position of the projection can be changed in such a way that the projection can be adapted to different drivers or drivers of different sizes. For this purpose, head-up displays often comprise a reflection element, which is usually a mirror, arranged in a beam path or in an optical path of the image generating unit which is movable, in particular pivotable, for being tilted, preferably adjustable by a drive unit, in order to adapt the position of the projected image, wherein for the adjustment of the reflection device usually an adjustment unit comprising an adjustment device is provided.

Adjustment units and adjustment devices for head-up displays and also head-up displays, in particular windshield head-up displays, which are configured for projecting a generated image onto a vehicle's windshield in a driver's field of view, comprising an adjustment unit with an adjustment device are in general, especially for motor vehicles, well known in the art, for example from US 2017/0315355 A1, JP 2014-215459A, WO 2019/054163 A1 or from DE 102018130920.1 of the applicant, which is not yet published at the time of filing of the present application, wherein in particular several different designs are known, in particular different clamping mechanisms for achieving a play-free adjustment kinematic to reduce vibrations of the reflection element for improving image projecting quality.

JP 2014-215459A for example teaches to bias the reflection device by means of a tension spring element. However, biasing the reflection device itself by a spring can make the assembly of the head-up display quite difficult. Furthermore, the spring force applied directly to the reflection element can cause unwanted stresses in the reflection element, in particular if the reflection element is a mirror made of glass.

WO 2019/054163 A1 discloses a clamping mechanism which is configured to clamp an adjustment lever in between to opposite arranged clamping elements, wherein one of the clamping elements is an elastic element, in particular an elastic blade spring element.

Against this background, it is one object of the present invention to provide an alternative adjustment device, in particular an improved adjustment device, which in particular enables providing an almost play-free adjustment kinematic, preferably without introducing unwanted stresses into the reflection element, and which in particular further enables a simple construction and is easy to assemble. It is further an object of the present invention to provide an alternative adjustment unit, in particular an improved adjustment unit, an alternative head-up-display, in particular an improved head-up display and an alternative vehicle, in particular an improved vehicle.

These objects are achieved by an adjustment device, by an adjustment unit, by a head-up display and by a vehicle with the features according to the respective independent claims. Advantageous embodiments of the invention are the subject of the dependent claims, the description and the figures.

An adjustment device according to the present invention may in particular be a displacement device, and is configured for adjusting a position and/or an orientation of a reflection device of a head-up display, in particular of a mirror device, in particular for moving a reflection device of a windshield head-up display to adjust its reflection device, wherein the adjustment device comprises a support structure and a clamping device received by the support structure. The clamping device is configured to be displaced along a first axis relatively to the support structure, wherein the clamping device is guided by the support structure whilst displacement. The clamping device is further couplable, directly or indirectly, with a drive unit for being displaced along the first axis relatively to the support structure by the drive unit. The clamping device comprises a first clamping element and a second clamping element arranged opposite to the first clamping element and forming a clamping gap together with the first clamping element, wherein the clamping device is configured to receive and clamp an adjustment lever of the reflection device to be adjusted between the first clamping element and the second clamping element in the clamping gap, and wherein the first clamping element and the second clamping element are made of separate parts.

An adjustment device according to the present invention is characterized in that the first clamping element and the second clamping element are rotatably coupled to each other about a second axis. This enables a relative rotational movement between the first clamping element and the second clamping element, in particular during displacement of the clamping device, which helps to keep the acting clamping force to a constant level. By the relative rotational movement between the first and second clamping elements in particular a decrease of the clamping force can be reduced or in some cases avoided. Thereby, a better clamping of the adjustment lever can be achieved, in particular with a lower inertial clamping force.

In one embodiment of an adjustment device according to the present invention, in particular in a preferred embodiment, the second axis extends parallel to a clamping gap length direction. This allows an advantageous, relative rotational movement between the first and second clamping elements, in particular in relation to the clamping force.

In general, an adjustment device according to the present invention may be adapted and configured for use in a head-up display comprising a combiner or for use in a windshield head-up display. Is the adjustment device adapted for use in a head-up display comprising a combiner, the adjustment device is configured to receive and clamp a reflection device which is configured to project an image to the combiner. Is the adjustment device adapted for use in a windshield head-up display, what is preferably the case, the adjustment device is configured to receive and clamp a reflection device which is adapted and configured for use in a windshield head-up display, wherein the reflection device is configured to project an image to the windshield.

Both kinds of head-up displays, head-up displays with combiner and windshield head-up displays, are in general well known from prior art to which is referred herewith for further details regarding general design and/or functionality aspects of such head-up displays.

In both cases, the reflection device of an adjustment device according to the present invention preferably comprises a reflection element which is configured for reflecting radiation emitted by an image generation unit, wherein the reflection element may comprise at least one mirror or may be a mirror.

A "reflection element" according to the present invention is an element, in particular a part or a group of parts being assembled, which is configured to reflect and/or influence radiation, for example changing direction, in particular of light or one or more light beams, respectively, and therefore in particular of one or more parts of an image or of a whole image.

In a preferred embodiment of an adjustment device according to the present invention, the reflection device further comprises at least one coupling member for mounting the reflection element to a housing, an adjustment device and/or a carrier respectively, wherein preferably at least one coupling member of the reflection device is an adjustment lever.

The adjustment lever may be coupled, in particular fixedly mounted, to the reflection element of the reflection device to be adjusted, wherein the reflection element of the reflection device is preferably configured to be adjusted by moving, in particular by displacement of the adjustment lever, along the first axis. The adjustment lever may be formed integral with the reflection element or may be part of a frame enclosing and/or surrounding the reflection element, as e.g. described in DE 10 2017 126 384 A1, and or may be mounted to the reflection element otherwise, may be by gluing.

In a preferred embodiment of an adjustment device according to the present invention the reflection device is adapted and configured to reflect or optically influence an image created by an image generation unit, wherein the image may for example contain one or more navigation information, a vehicle velocity information or any other information which might be an interesting information for a driver of a vehicle as it is known from prior art.

The reflection device may, for example, comprise an adjustment lever on its bottom side, related to a functional state of assembly of the reflection device in a head-up display, in particular in a vehicle and preferably in addition further two bearing balls or bearing levers arranged opposite to each other at the lateral sides of the reflection element, in particular one at the left side and the second at the right side of the reflection element.

In an advantageous embodiment of an adjustment device according to the present invention, the adjustment device, in particular the clamping device, is configured to receive and clamp a bottom adjustment lever of a reflection device. Thereby, a very easy adjustment of the reflection element can be achieved, in particular if the reflection device is configured to be mounted rotatably about a rotation axis, in particular about a horizontal rotation axis, via, for example, two adjusting left and right bearing balls or bearing levers, to a carrier or a housing of a head-up display device or to a vehicle, because in this case a rotational movement of the reflection device about the rotation axis can easily be achieved by a linear displacement of the bottom adjustment lever of the reflection device by means of an actuator unit. As a result, a position and/or an orientation of the reflection device, in particular of the reflection element, can be adjusted very easily.

The term "support structure" as used herein refers to a structure by which the clamping device is at least partly supported. The support structure of an adjustment device according to the present invention may be assembled of one or more components or may be formed by a single part, i.e. integrally, wherein the support structure is preferably made of plastic material due to weight reasons. Alternatively, the support structure can be made of metal or may comprise metal.

At least one clamping element is due to weight reasons preferably (also) made of plastic material, preferably both clamping elements. Alternatively, at least one clamping element can be made of metal or may comprise metal.

In an advantageous embodiment of an adjustment device according to the present invention for guiding of the clamping device the support structure is designed as a sled guide, wherein therefore the support structure may comprise a guiding rack and/or a guiding bar and/or may comprise a guiding groove, which engages with at least one of the clamping elements of the clamping device, in particular such that the clamping device is configured to be displaced slidably along the first axis relatively to the support structure.

In general, the clamping device of an adjustment device according to the present invention is directly or indirectly couplable with a drive unit, wherein at least one of the clamping elements is couplable to the drive unit, and wherein "indirectly" herein means "with at least one component arranged in between clamping device and drive unit in the load path". Correspondingly, "directly" means without any component or part in between the load path.

In one embodiment of an adjustment device according to the present invention, in particular in a further embodiment, the clamping device may be configured to receive and clamp an adjustment lever comprising an oval shape or a spherical shape or a ball-like shape, in particular an oval shaped or a spherical shaped or ball-like shaped end of an adjustment lever of a reflection device. This enables adjusting different angular orientations of the adjustment lever and therefore of the reflection element in an easy way since clamping device and adjustment lever form a pivot joint, in particular a ball joint or a ball-like joint. Further, such an adjustment lever can be easily and reliably held in the clamping device.

In one embodiment of an adjustment device according to the present invention, in particular in a further embodiment, the first clamping element comprises a first clamping surface and the second clamping element comprises a second clamping surface arranged opposite to the first clamping surface and forming a clamping gap together with the first clamping surface, wherein the clamping device is configured to receive and clamp an adjustment lever of a reflection device between the first clamping surface of the first clamping element and the second clamping surface of the second clamping element in the clamping gap, wherein in particular first and/or second clamping surface extends orthogonal to the first axis. Thereby, a reliable clamping of the adjustment lever can be achieved. With clamping surfaces orientated such they are extending orthogonal to the first axis a sufficient clamping during displacement of the clamping device can be achieved since the clamping force applied by the biasing element can be used well.

Alternatively, at least one of the clamping surfaces can be inclined. In one embodiment the clamping surfaces may, for example, be arranged such they are forming a "V" or a "Y", i.e. that the resulting clamping gap is V-shaped or Y-shaped, wherein the clamping surfaces are preferably orientated such the opening (of the "V" or "Y") faces the reflection element and/or is orientated to the top of the clamping device, related to a state of finished assembly in a head-up display or a functional state of use in a vehicle. The orientation of the opening of the clamping gap to the top side enables a very easy assembly of a head-up display according to the present invention, in particular a very easy assembly of a reflection device to the adjustment device, in particular to the clamping device, because the adjustment lever can be inserted from above in the clamping gap.

In a preferred embodiment of an adjustment device according to the present invention, in particular in a further embodiment, the first and second clamping surfaces may extend vertical, related to a state of finished assembly in a head-up display or a functional state of use in a vehicle, wherein the first axis in particular extends horizontal. This enables on the one hand a very easy assembly of a head-up display according to the present invention, in particular a very easy assembly of a reflection device to the adjustment device, in particular to the clamping device, because the adjustment lever can be inserted from above in the clamping gap. On the other hand, vertical clamping surfaces enable the adjustment lever to be introduced sufficiently deep into the clamping gap.

In one embodiment of an adjustment device according to the present invention, in particular in a further embodiment, at least one of the first and second clamping surfaces is a plane surface, preferably both clamping surfaces, wherein in particular at least one of the first and second clamping surfaces is at least substantially a closed surface. This enables a very easy manufacturing of the clamping surfaces and therefore of the clamping elements and as a consequence of the adjustment device and a head-up display.

Alternatively to a plane clamping surface, in another embodiment of an adjustment device according to the present invention at least one clamping surface may comprise a concave recess, wherein the recess in particular may be shaped complementary to the adjustment lever's shape. Thereby, an improved guidance of the adjustment lever in the clamping gap can be achieved. Furthermore, a surface pressure acting on the components can be reduced by the resulting larger contact area between the components. However, in some cases higher clamping forces might be necessary to achieve the required stability of the joint.

In another alternative embodiment, at least one clamping surface may comprise a hole having a diameter smaller than a protruding adjustment lever contour, for example a hole being smaller than the diameter of a sphere or ball element of an adjustment lever, such that the protruding adjustment lever contour will protrude the hole only partly when being received and clamped in the clamping gap, wherein by the hole the protruding adjustment lever contour may be centred.

In an alternative embodiment, the clamping device may be configured to receive and clamp an adjustment lever comprising a flat shape, in particular a plate-like shape, in particular a flat, plat-like shaped end of an adjustment lever of a reflection device. Therefore, the clamping device may comprise at least one clamping element having a clamping surface with at least one bump, in particular with at least one hemispherical bump as it is known from prior art, e.g. from above-mentioned JP 2014-215459 A1.

In one embodiment of an adjustment device according to the present invention, in particular in a further embodiment, at least one of the first and second clamping surfaces is rigid, in particular both, wherein preferably at least one of the first and second clamping elements is rigid, preferably both, that means preferably none of the clamping elements is made of an elastic material as e.g. of a spring steel or of a thin metal strip. Thereby, a precise and more rigid coupling of the reflection device, in particular of the adjustment lever, to the clamping device can be achieved. This allows in particular to reduce movement of the adjustment lever, in particular in direction of the first axis. As a consequence, vibrations of the adjustment lever and therefore of the reflection element can be reduced and a high image projecting quality can be achieved, provided that stiffness and preload of the biasing element are chosen high enough.

In one embodiment of an adjustment device according to the present invention, in particular in a further embodiment, at least one clamping surface and/or the surface of the adjustment lever in a clamping area may be at least partly smooth and/or may have at least partly a defined roughness. By adapting surface roughness and/or smoothness of the clamping surfaces friction behaviour between the adjustment lever and the clamping surfaces and therefore joint properties can be influenced, wherein a smoother surface allows an easier and may be more precise adjustment of the reflection device, wherein by a rougher surface reliability of the joint may be improved.

In one embodiment of an adjustment device according to the present invention, in particular in a further embodiment, the clamping device further comprises at least one biasing element for generating a clamping force to clamp the adjustment lever between the first clamping element and the second clamping element, wherein preferably at least one biasing element is an elongated biasing element particularly extending in a clamping gap width direction. By the biasing element a play-free clamping of the adjustment lever in the clamping mechanism can be achieved. This enables providing an almost play-free kinematic mechanism for adjusting the reflection device, in particular the reflection device.

In one embodiment of an adjustment device according to the present invention, in particular in a further embodiment the biasing element is coupled, in particular mounted, to the first clamping element and to the second clamping element. By the biasing element coupled, in particular mounted, to the first clamping element and to the second clamping element and not to the reflection device itself, an introduction of unwanted stresses into the reflection element can be avoided. By mounting the biasing element to the first and second clamping elements a simple clamping device requiring only a few components and as a result a simple adjustment device can be provided. The coupling of the biasing element to the clamping elements and not to the reflection device further enables a very easy assembly of the reflection device, in particular its adjustment lever, to the clamping device of the adjustment device.

In general, an adjustment device according to the present invention may comprise one or more biasing elements. In most use cases, with only one biasing element a sufficient clamping force can already be generated. However, in some use cases providing two or more biasing elements can be more advantageous, wherein, if an even number of biasing elements is provided, the biasing elements are preferably arranged symmetrically to the contact zones between the adjustment lever and the clamping elements to generate a symmetric clamping force.

In one embodiment of an adjustment device according to the present invention, in particular in a further embodiment, at least one biasing element comprises a spring element or is a spring element, in particular a tension spring. Thereby, a biasing element having a very simple construction and a low weight can be provided. As a consequence, a simple clamping device and as a result a simple adjustment device can be provided. Furthermore, by choice of spring length and spring stiffness, the resulting clamping force can easily be adapted, in particular adjusted. This allows providing a clamping device being adapted precisely to a respective use case.

At least one biasing element of the clamping device may span the clamping gap, in particular partly, preferably in a peripheral zone of the clamping gap, wherein in this case the biasing element is preferably mounted directly to the first clamping surface and/or directly to the second clamping surface or directly to a surface adjacent to the clamping surface and/or to a surface surrounding the clamping surface. This allows the clamping force to be generated near by the contact zones of the clamping joint. Thereby, a momentum caused by the clamping force and acting on the clamping elements can be reduced and clamping of the adjustment lever can be improved. The arrangement of the biasing element in the clamping gap, in particular near by the contact zones of the clamping joint, can in particular be advantageous, if only one biasing element is provided or if the biasing elements provided are arranged asymmetrically.

Alternatively or additionally, at least one biasing element of the clamping device of an adjustment device according to the present invention may be arranged outside the clamping gap, wherein in this case the biasing element is preferably mounted to an outer side, in particular to an outer surface, of the first and/or the second clamping element. This allows a very easy assembly of the adjustment device, in particular of the biasing element, because of a particularly good accessibility of the connection points for mounting the biasing element. At least one biasing element may, for example, be mounted outside the clamping gap to the first clamping element and/or to the second clamping element respectively via a hook or a lug hold by a bolt extending parallel to a gap length direction. This allows a simple construction of the clamping device and a very easy assembly of the biasing element to the clamping elements.

In one embodiment of an adjustment device according to the present invention, in particular in a further embodiment, at least one biasing element extends parallel to a plane in which the first axis extends, wherein at least one biasing element in particular extends parallel to the first axis. Thereby, a very reliable clamping of the adjustment lever can be achieved. With at least one biasing element orientated parallel to a plane in which the first axis extends, sufficient clamping during displacement of the clamping device can be achieved since the clamping force applied by the biasing element can be used well.

Are first and second clamping surfaces extending orthogonal to the first axis, at least one biasing element in particular extends orthogonal to the first and second clamping surfaces. This allows an effective use of the clamping force applied.

In one embodiment of an adjustment device according to the present invention, in particular in a further embodiment, the first clamping element and the second clamping element are made of separate parts, wherein the first clamping element and the second clamping element are in particular coupled to each other, preferably movably relatively to each other, in particular such that a gap width is adjustable, preferably adaptable to the dimensions of the adjustment lever. This enables, in combination with the at least one biasing element of the clamping device, providing of a play-free clamping of the adjustment lever.

In one embodiment of an adjustment device according to the present invention, in particular in a further embodiment, the first clamping element and the second clamping element are rotatably coupled to each other, in particular rotatably about a second axis, wherein the second axis preferably extends parallel to a clamping gap length direction, wherein in a preferred embodiment the second axis extends preferably rectangular to the first axis and is preferably a horizontal axis related to a functional state of use in a vehicle. This allows to provide a clamping device which enables providing of a play-free clamping of the adjustment lever with a very simple construction, in particular with a much simpler construction compared, for example, to the clamping device disclosed in the above-mentioned WO 2019/054163 A1.

For rotational coupling of the second clamping element to the first clamping element, the first clamping element may, for example comprise, two bolts arranged opposite to each other on an outer surface of the first clamping element extending parallel to the gap width direction, wherein each of the two bolts preferably extends parallel to the gap length direction and in particular serves as a pivot. The second clamping element may comprise corresponding bearing portions configured to engage with said bolts for forming the rotational coupling between the first and second clamping elements. Alternatively, at least one bolt may be part of the second clamping element and/or at least one bearing portion may be part of the first clamping element. At least one bolt may be formed integrally with the associated clamping element to which the bolt is fixedly mounted. Instead of using one or more bolts for the rotational coupling of the first and second clamping elements one or more screws may be used.

In a preferred embodiment bolts and bearing portions are configured such that in a coupled state of first and second clamping elements axial movement of the clamping elements relative to each other along the rotation axis is at least limited, in particular avoided. The rotational joint between the two clamping elements may in particular be configured as a latching connection, in particular as a detachable latching connection. However, in some cases a non-detachable connection might be more advantageous, in particular in cases which allows less relative axial movement between the first and second clamping elements.

In one embodiment of an adjustment device according to the present invention, in particular in a further embodiment, the clamping device is configured to be coupled to the drive unit only via one of the clamping elements, in particular only via the first clamping element, wherein the second clamping element is preferably coupled to said first clamping element, preferably movably, in particular rotatably, preferably rotatably about a second axis, wherein the second axis preferably extends parallel to a clamping gap length direction. Thereby, a very simple construction of a clamping device can be achieved. For adaptation of the clamping device to the coupling interface of the drive unit to which it has to match just one clamping element has to be adapted, in particular just the first one. That allows an easy adaptation, in particular if the first and second clamping elements are formed as separate parts. Then just by exchanging the first clamping element the clamping device can be adapted to the drive unit's interface.

An adjustment unit according to the present invention for adjusting a position and/or an orientation of a reflection device of a head-up display, in particular of a mirror device, in particular for moving a reflection device of a windshield head-up display to adjust the reflection device, comprises an adjustment device and a drive unit coupled to the clamping device of the adjustment device, wherein the clamping device is displaceable by the drive unit along the first axis, is characterized in that the adjustment unit comprises an adjustment device according to the present invention.

In general, the clamping device may be coupled to a rotary drive unit or to a linear drive unit. However, to perform a displacement of the clamping device along the first axis by the drive unit, in particular a linear displacement respectively a linear translation, in case of a rotary drive unit at least one additional transfer component is necessary between drive unit and clamping device to converse rotational movement of the drive unit into linear movement. Such a transfer component may be, for example, a spindle or a worm of a worm gear.

As a consequence, for an adjustment unit with a linear drive unit less components are necessary compared to an adjustment unit with a rotary drive unit, which requires additionally at least one transfer element. Hence, in a preferred embodiment of an adjustment unit according to the present invention, in particular in a further embodiment, the drive unit is a linear drive unit, wherein the drive unit is in particular coupled directly to the clamping device, in particular to the first clamping device.

In one embodiment of an adjustment unit according to the present invention, in particular in a further embodiment, the drive unit is coupled to the first clamping element only, wherein the drive unit is preferably coupled, in particular fixedly mounted, directly to the first clamping element.

The support structure of an adjustment unit according to the present invention serves in particular as a sled guide, wherein the support structure may comprise a guiding rack or a guiding bar or may comprise a guiding groove which engages with at least one of the clamping elements of the clamping device, in particular such that the clamping device is configured to be displaced slideably along the first axis relatively to the support structure.

In an alternative embodiment of an adjustment unit according to the present invention, the drive unit is a rotary drive unit, wherein the drive unit is preferably coupled indirectly to the clamping device, preferably via at least one transfer element for conversion rotational movement to linear movement, wherein the transfer element may be, for example, a spindle or a worm of a worm gear. In a further embodiment of said alternative embodiment comprising a rotary drive, the support structure may comprise a rotatably mounted spindle or worm which engages with at least one of the clamping elements of the clamping device and which is coupled to the rotary drive unit such that by the drive unit a displacement of the clamping device can be caused by rotating of the spindle or the worm respectively, wherein the spindle or the worm is in particular also coupled to the first clamping device, preferably to the first clamping device only.

A head-up display according to the present invention comprises an adjustable reflection device for reflecting light beams emitted by an image generating unit into an observer's field of view, wherein the reflection device comprises a reflection element and at least on adjustment lever.

A head-up display according to the present invention is characterized in that the head-up display further comprises an adjustment device according the present invention or an adjustment unit according to the present invention wherein the adjustment lever of the reflection device is received and clamped by the clamping device of the adjustment device.

The adjustment lever received and clamped by the clamping device is preferably an adjustment lever arranged on the bottom side of the reflection element of the reflection device, related to a functional state of assembly of the reflection device in the head-up display, in particular related to a functional state of assembly of the head-up display in a vehicle, wherein by the bottom adjustment lever a rotational movement of the reflection device about the rotation axis can be caused by the drive unit.

A head-up display according to the present invention may in general be a combiner head-up display or a windshield head-up display. However, in a preferred embodiment of a head-up display according to the present invention, the head-up display is a windshield head-up display.

In a preferred embodiment of a head-up display according to the present invention, the head-up display further comprises an image generating unit for emitting light beams to produce an image.

A motor vehicle comprises a head-up display, characterized in that the head-up display is designed according to the present invention.

To avoid repeats, several features of the subject-matter of the present invention presented herein, their technical effects and their advantages are described only once. However, the features, their technical effects and their advantages described in relation to an adjustment device according to the present invention apply correspondingly to an adjustment unit according to the present invention, to a head-up-display according to the present invention and to a vehicle according to the present invention and vice versa.

Further features of the invention will become apparent from the claims, the figures and the description of the figures. All the features and feature combinations mentioned above in the description as well as the features and feature combinations mentioned below in the description of the figures and/or shown alone in the figures can be used not only in the respectively indicated combination but also in other combinations or alone so far, the resulting combination may be carried out.

The invention will now be described with reference to several preferred, but non-limiting embodiments of the present invention and with reference to the accompanying drawings, wherein it is shown in FIG. 1 an assembly of a first embodiment of a head-up display according to the present invention comprising a reflection device and a first embodiment of an adjustment unit according to the present invention in a perspective view, FIG. 2 an enlarged section of the adjustment unit of FIG. 1 in a perspective view from diagonally above, FIG. 3 a part of the enlarged section of the adjustment device of FIG. 2 in a top view, FIG. 4 the clamping device of the adjustment unit of FIGS. 1 to 3 in a perspective view, FIG. 5 the clamping device of FIGS. 1 to 4 in a side view, FIG. 6 parts of an assembly of a second embodiment of a head-up display according to the present invention comprising a second embodiment of an adjustment unit according to the present invention in a perspective view, and FIG. 7 the adjustment unit of FIG. 6 in a perspective view.

In FIG. 1 an assembly 100 of a first embodiment of a windshield head-up display for a vehicle according to the present invention is illustrated in a perspective view, comprising an adjustable reflection device 20 for reflecting light beams emitted by an image generating unit (not illustrated) of the head-up display into an driver's field of view and a first embodiment of an adjustment unit 10 according to the present invention, wherein adjustment unit 10 comprises a first embodiment of an adjustment device 11 according to the present invention and a drive unit 12, which is coupled to the adjustment device 11.

The reflection device 20 comprises a reflection element 21, which is supported by means of a carrier 23, which is mounted to a back side of the reflection element 21. On the left side and on the right side of the reflection element 21 ball-shaped bearing elements 24 are mounted to the carrier 23 for coupling the reflection device 20 rotatably to a housing (not illustrated) of the head-up display such that the reflection device 20 is pivotable about a pivot axis A.

In this embodiment the reflection element 21 is a concave mirror element 21 made of glass having a substantially rectangular outer contour and a concave reflection side. For minimum weight and minimum space requirements the reflection element 21 is shaped as a thin shield.

The reflection device 20 further comprises an adjustment lever 22 arranged on the bottom side of the reflection element 21, wherein the adjustment lever 22 in this embodiment is mounted to a rear side of the reflection element 21 by means of a gluing pad which is non-visible in this illustration.

According to the present invention the adjustment lever 22 of the reflection device 20 is received and clamped by a clamping device 14 of the adjustment device 11, wherein for a reliable clamping the end 25 of adjustment lever 22 is ball-shaped and comprises a sphere 25 via which the adjustment lever 22 is clamped.

The clamping device 14 is displaceable along a first axis R1 by drive unit 12, which in this embodiment is a linear drive unit 12, wherein a linear displacement of the clamping device 14 causes a displacement of adjustment lever 22, wherein linear displacement of the clamping device 14 results in a rotational movement of the reflection element 21 about rotation axis A, whereby a tilting angle of the reflection element 21 and therefore a position and/or an orientation of the reflection element 21 can be adjusted.

According to the present invention and in addition to the clamping device 14, the adjustment device 11 further comprises a support structure 13, wherein the clamping device 14 is received by said support structure 13. By drive unit 12, which is coupled to the clamping device 14, the clamping device 14 can be displaced along the first axis R1 relatively to the support structure 13, wherein the clamping device 14 is guided by the support structure 13 whilst displacement.

Figure 2:
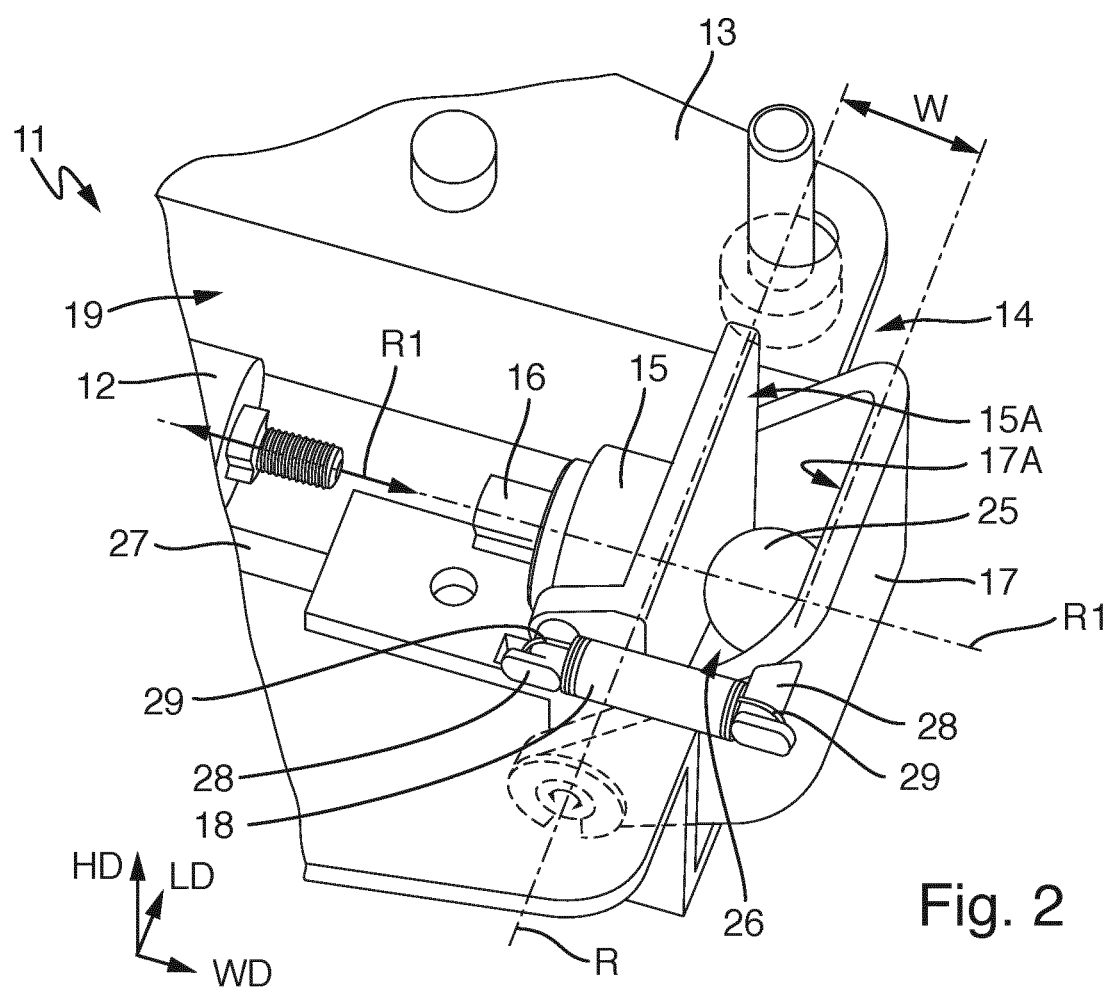
Figure 3:
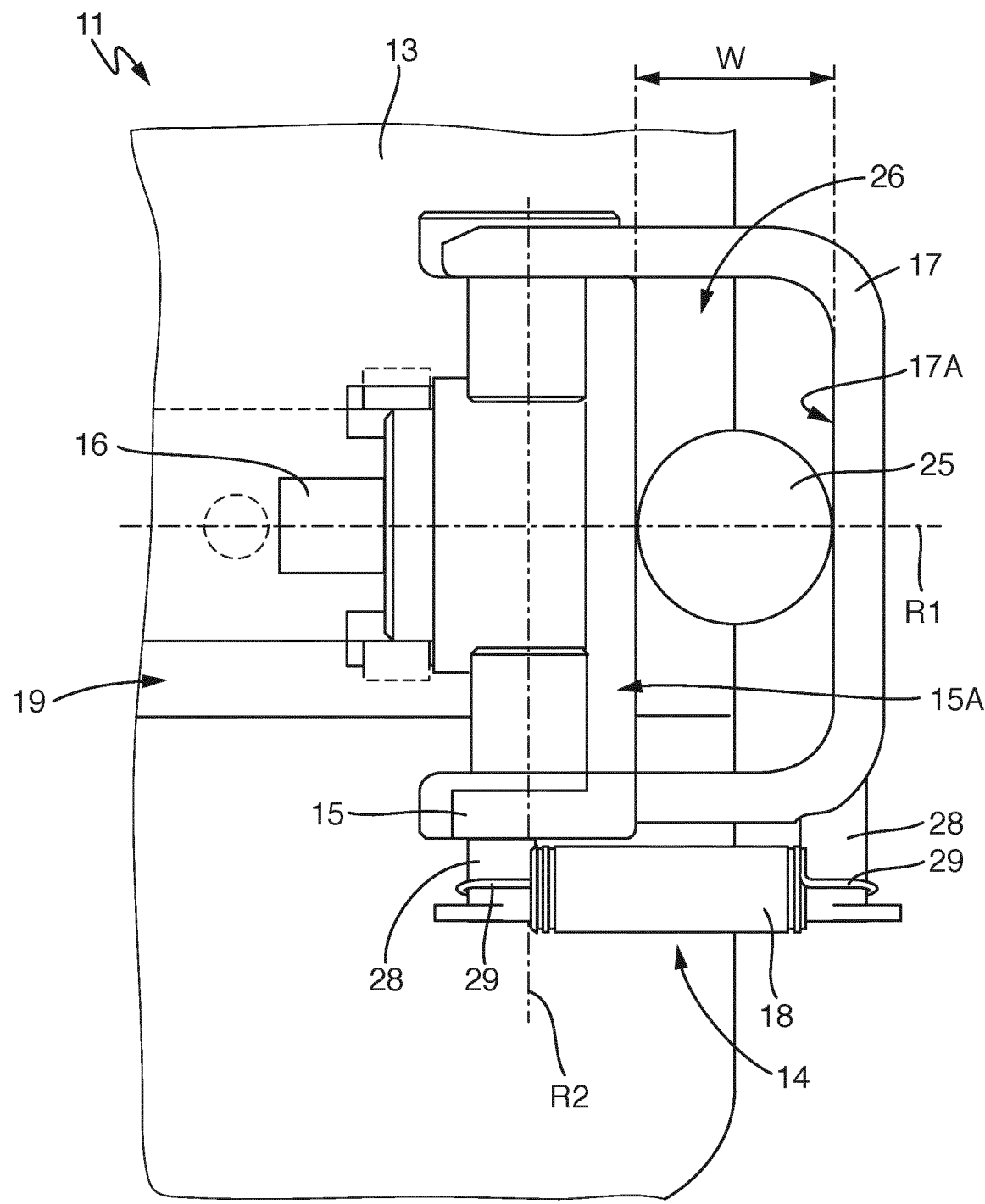
Figure 4:
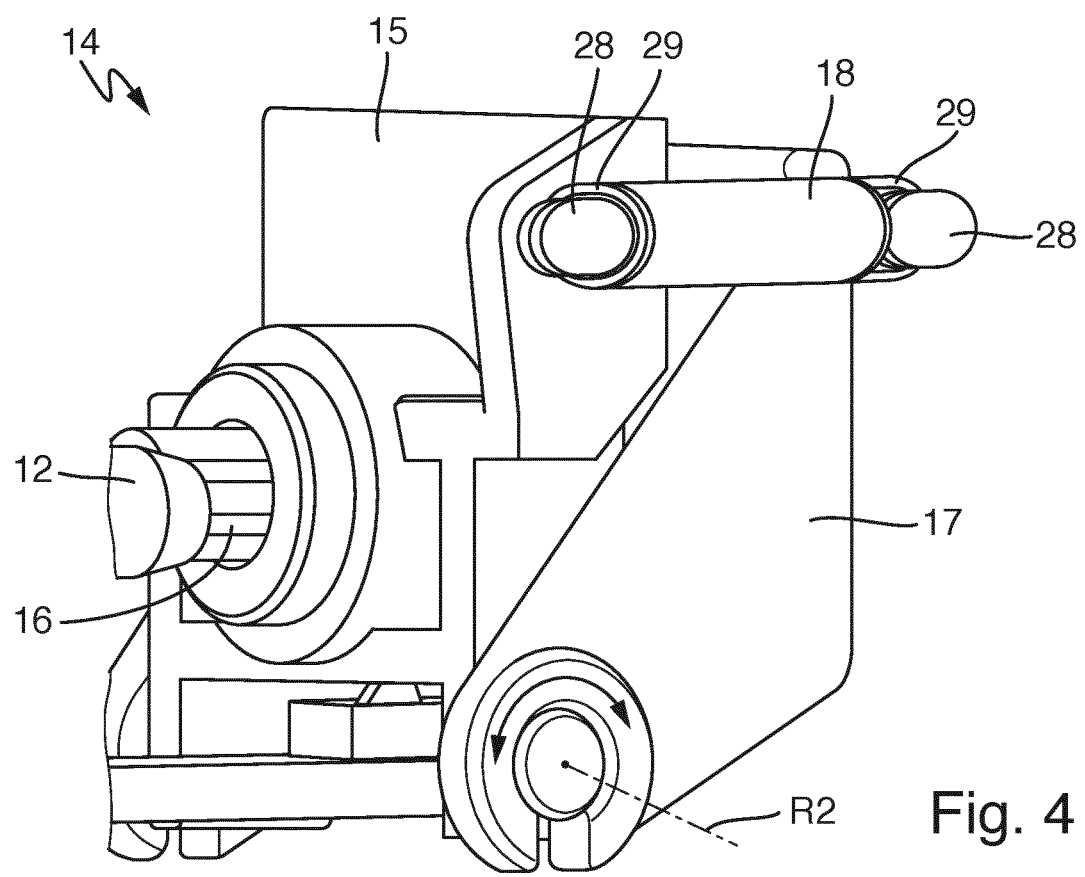
Figure 5:
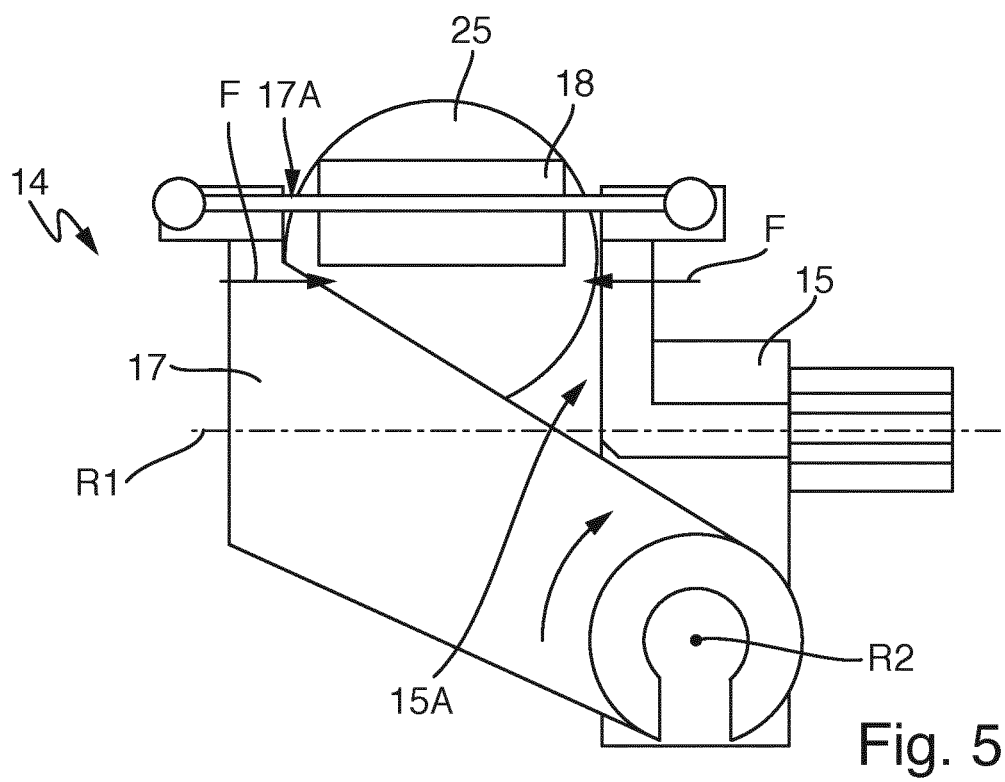

As illustrated in FIGS. 2 to 5, wherein FIG. 2 shows an enlarged section of the adjustment unit 10 of FIG. 1 in a perspective view from diagonally above, FIG. 3 a portion of the enlarged section of the adjustment device 11 of FIG. 2 in a top view, FIG. 4 the clamping device 14 of the adjustment unit 10 of FIGS. 1 to 3 in a perspective view and FIG. 5 the clamping device 14 of FIGS. 1 to 4 in a side view, the clamping device 14 of the adjustment device 10 comprises a first clamping element 15 and a second clamping element 17, wherein the first and second clamping elements 15 and 17 are arranged opposite to each other forming a clamping gap 26 in between by which the adjustment lever 22, in particular its ball-shaped end 25, which is introduced in the clamping gap 26 of the clamping device 14, is received and clamped, wherein the first and second clamping elements 15 and 17 are made of a substantially rigid material as, for example, of POM (Polyoxymethylene), PA (Polyamide) or PC (Polycarbonate), i.e. they are not made of a substantially elastic material as for example of spring steel or thin metal strips or of rubber.

The support structure 13 serves as a sled guide for the clamping device 14, wherein the support structure 13 comprises a guiding groove 19 and a guiding bar 27, each engaging with the first clamping element 15 of the clamping device 14, wherein the clamping device 14 is configured to be displaced slidably along the first axis R1 relatively to the support structure 13.

Via coupling element 16 the drive unit 12 can be coupled respectively is coupled to the first clamping element 15, wherein in this embodiment the adjustment device 11 is configured such that the drive unit 12 can be coupled to the first clamping element 15 only.

The first clamping element 15 comprises a first clamping surface 15A and the second clamping element 17 comprises a second clamping surface 17A, which are in contact with the sphere 25 of the end of the adjustment lever 22 and clamp the sphere 25 in between, wherein the first and second clamping surfaces 15A and 17A are plane and closed and smooth surfaces 15A and 17A and are arranged opposite to each other and extend orthogonal to the first axis R1.

For a play-free clamping of the adjustment lever 22 the first clamping element 15 and the second clamping element 17 are made of separate parts according to the present invention, wherein the first clamping element 15 and the second clamping element 17 are rotatably coupled to each other about a second axis R2, wherein the second axis R2 extends parallel to a clamping gap length direction LD such that a gap width W is adjustable.

This enables a relative rotational movement between the first clamping element 15 and the second clamping element 17, in particular during displacement of the clamping device 14, which helps to keep the acting clamping force F to a constant level. By the relative rotational movement between the first and second clamping elements 15, 17 in particular a decrease of the clamping force F can be reduced or in some cases avoided. Thereby, a better clamping of the adjustment lever 22 can be achieved, in particular with a lower inertial clamping force.

For rotational coupling of the second clamping element 17 to the first clamping element 17, the first clamping element 15 comprises two unnamed bolts arranged opposite to each other on an outer surface of the first clamping element 15 extending parallel to the gap width direction WD, wherein each of the two bolts extends parallel to the gap length direction LD and serves as a pivot. The second clamping element 17 comprises corresponding also unnamed bearing portions configured to engage with said bolts for forming the rotational coupling between the first and second clamping elements 15 and 17. The bolts are formed integrally with the respective associated clamping element 15, 17.

The bolts and bearing portions are configured such that in a coupled state of first and second clamping elements 15, 17 an axial movement of the clamping elements 15, 17 relative to each other along the rotation axis R2 is limited, wherein the rotational joint between the two clamping elements 15, 17 is configured as a detachable latching connection.

The clamping device 14 further comprises a biasing element 18, in this embodiment only one biasing element 18, for generating a clamping force F (see FIG. 5) to clamp the adjustment lever 22, in particular its ball-shaped end 25, in-between the first clamping element 15 and the second clamping element 17, wherein the biasing element 18 is an elongated biasing element 18 extending in a clamping gap width direction WD and in this embodiment parallel to the first axis R1 and orthogonal to the first and second clamping surfaces 15A and 17A, wherein the biasing element 18 is mounted to the first clamping element 15 and to the second clamping element 17. In this embodiment the biasing element 18 is a spring element 18, in particular a tension spring 18.

In this embodiment of an adjustment device 14 according to the present invention the spring element 18 forming the biasing element 18 is arranged outside the clamping gap 26, wherein the biasing element 18 is mounted to an outer side, in particular to an outer surface, of the first and second clamping elements 15 and 17. In this embodiment, the biasing element 18 is mounted to the clamping elements 15 and 17 respectively via a closed lug 29 hold by a bolt 28 extending parallel to a clamping gap length direction LD. This allows a simple construction of the clamping device 14 and a very easy assembly of the biasing element 18 to the clamping elements 15 and 17.

Figure 6:
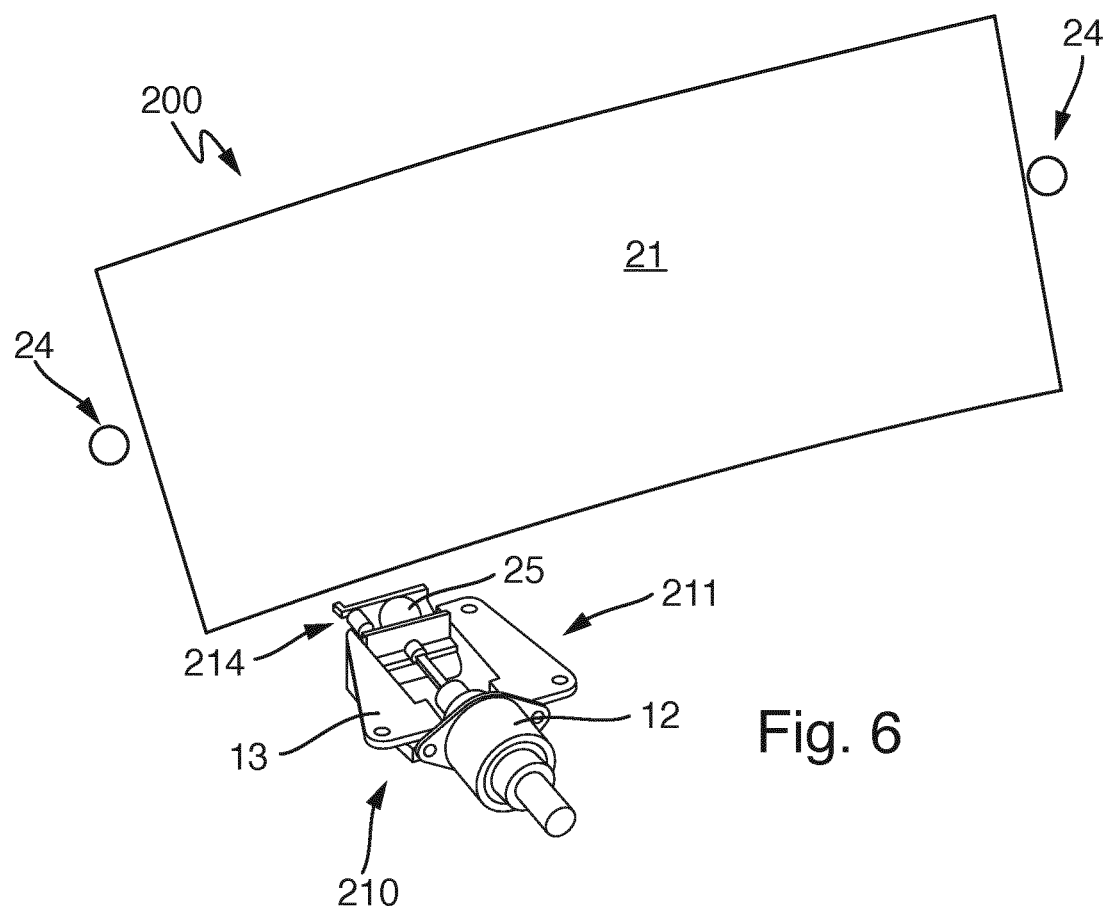
Figure 7:
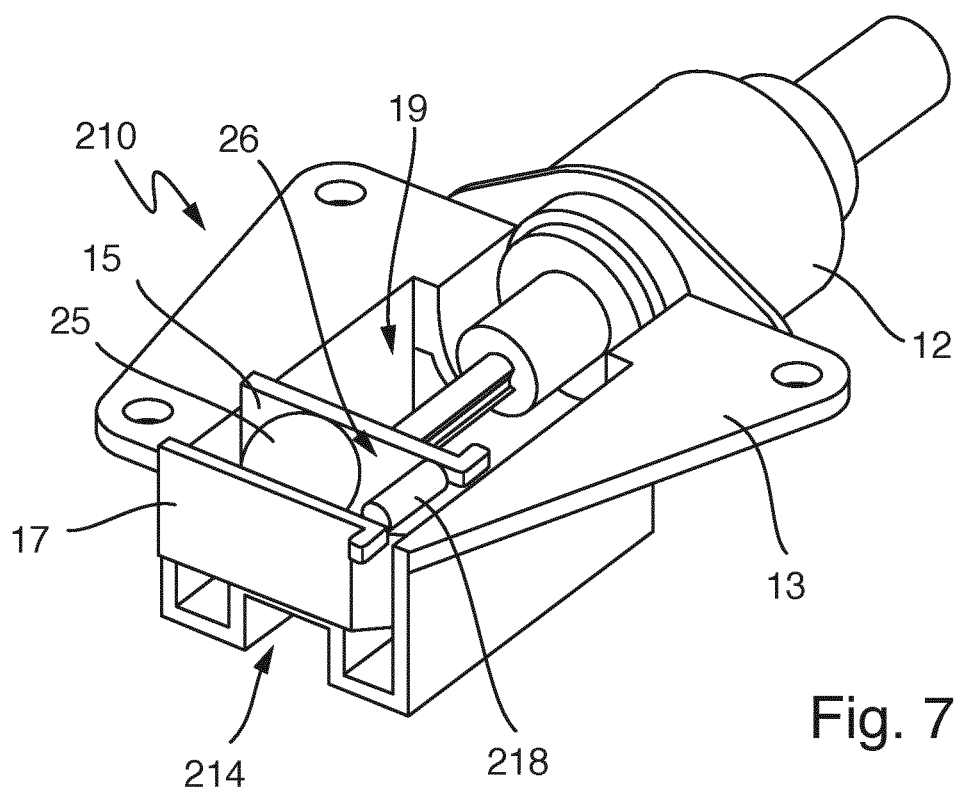

In FIG. 6 parts of an assembly 200 of a second embodiment of a head-up display according to the present invention are illustrated, comprising a second embodiment of an adjustment unit 210 according to the present invention in a perspective view, wherein FIG. 7 shows the adjustment unit 210 of FIG. 6 in a perspective view.

This adjustment unit 210 differ from the adjustment unit 10 described with reference to FIGS. 1 to 5 in the design of the adjustment device 210, in particular in the design of the clamping devices 14 respectively 214, in particular in arrangement and mounting of the biasing element 18 respectively 218.

In the embodiment of an adjustment device 211 according to the present invention shown in FIGS. 6 and 7, the biasing element 18, which is also a tension spring 18, is arranged within in the clamping gap 26 and spans the clamping gap 26 partly in a peripheral zone of the clamping gap 26, wherein the biasing element 18 is mounted directly to the first and second clamping surfaces 15A and 17A. This allows the clamping force F (see. FIG. 5) to be generated near by the contact zones of the clamping joint. Thereby, a momentum caused by the clamping force F and acting on the clamping elements 15 and 17 can be reduced and clamping of the adjustment lever 22 can be improved.

REFERENCE SIGN LIST 100, 200 assembly of parts of a head-up display according to the present invention
10, 210 adjustment unit according to the present invention
11, 211 adjustment device according to the present invention
12 drive unit
13 support structure
14, 214 clamping device
15 first clamping element
15A first clamping surface
16 coupling element for coupling with drive unit
17 second clamping element
17A second clamping surface
18 biasing element (tension spring)
19 guiding groove
20 reflection device
21 reflection element
22 adjustment lever
23 carrier
24 bearing ball
25 ball-shaped adjustment lever end (sphere)
26 clamping gap
27 guiding bar
28 bolt
29 lug
A pivot axis of the reflection device
LD clamping gap length direction
R1 first axis
R2 second axis
W clamping gap width
WD clamping gap width direction

The invention claimed is:

1. An adjustment device for adjusting a position and/or an orientation of a reflection device of a head-up display comprising a mirror device, for moving the reflection device of a windshield head-up display to adjust the reflection device, wherein the adjustment device comprises:
a support structure; and
a clamping device received by the support structure,
wherein the clamping device is configured to be displaced along a first axis relatively to the support structure,
wherein the clamping device is guided by the support structure whilst displacement,
wherein the clamping device is couplable, directly or indirectly, with a drive unit for being displaced along the first axis relatively to the support structure by the drive unit,
wherein the clamping device comprises a first clamping element and a second clamping element arranged opposite to the first clamping element and forming a clamping gap together with the first clamping element,
wherein the clamping device is configured to receive and clamp an adjustment lever of the reflection device to be adjusted between the first clamping element and the second clamping element in the clamping gap, and
wherein the first clamping element and the second clamping element are made of separate parts, and wherein the first clamping element and the second clamping element are rotatably coupled to each other about a second axis.

2. The adjustment device according to claim 1, wherein the second axis extends parallel to a clamping gap length direction.

3. The adjustment device according to claim 1, wherein the clamping device is configured to receive and clamp an adjustment lever comprising an oval shape or a spherical shape or a ball-like shape, in particular an oval shaped or a spherical shaped or ball-like shaped end of an adjustment lever of a reflection device.

4. The adjustment device according to claim 1, wherein the first clamping element comprises a first clamping surface and the second clamping element comprises a second clamping surface arranged opposite to the first clamping surface and forming a clamping gap together with the first clamping surface, wherein the clamping device is configured to receive and clamp an adjustment lever of a reflection device between the first clamping surface of the first clamping element and the second clamping surface of the second clamping element in the clamping gap, wherein in particular the first and/or second clamping surface extends orthogonal to the first axis.

5. The adjustment device according to claim 4, wherein at least one of the first and second clamping surfaces is a plane surface, preferably both clamping surfaces, wherein at least one of the first and second clamping surfaces is at least substantially a closed surface.

6. The adjustment device according to claim 4, wherein at least one of the first and second clamping surfaces is rigid, in particular both, wherein preferably at least one of the first and second clamping elements is rigid.

7. The adjustment device according to claim 1, wherein the clamping device further comprises at least one biasing element for generating a clamping force to clamp the adjustment lever between the first clamping element and the second clamping element, wherein at least one biasing element is an elongated biasing element extending in a clamping gap width direction.

8. The adjustment device according to claim 7, wherein the biasing element is mounted to the first clamping element and to the second clamping element.

9. The adjustment device according to claim 7, wherein at least one biasing element comprises a spring element or is a tension spring.

10. The adjustment device according to claim 7, wherein at least one biasing element extends parallel to a plane in which the first axis extends, wherein at least one biasing element extends parallel to the first axis.

11. The adjustment device according to claim 7, wherein the clamping device is configured to be coupled to the drive unit only via the first clamping element.

12. An adjustment unit for adjusting a position and/or an orientation of a reflection device of a head-up display, for moving a reflection device of a windshield head-up display to adjust the reflection device, comprising:
the adjustment device according to claim 1; and
a drive unit coupled with the clamping device of the adjustment device,
wherein the clamping device is displaceable by the drive unit along the first axis.

13. The adjustment unit according to claim 12, wherein the drive unit is a linear drive unit.

14. The adjustment unit according to claim 12, wherein the drive unit is coupled to the first clamping element only, wherein the drive unit is fixedly mounted directly to the first clamping element.

15. A head-up display for a vehicle windshield head-up display, comprising:
an adjustable reflection device for reflecting light beams emitted by an image generating unit into an observer's field of view, wherein the reflection device comprises a reflection element and at least one adjustment lever; and
the adjustment device according to claim 1,
wherein the at least one adjustment lever of the reflection device is received and clamped by the clamping device of the adjustment device in the clamping gap.

16. A motor vehicle comprising a head-up display, wherein the head-up display is designed according to claim 15.

* * * * *